United States Patent

[11] 3,609,656

| [72] | Inventor | Delight E. Breidegam, Jr.<br>College Hill, Kutztown, Pa. 19530 |
|---|---|---|
| [21] | Appl. No. | 10,774 |
| [22] | Filed | Feb. 12, 1970 |
| [45] | Patented | Sept. 28, 1971 |

[54] BATTERY TERMINAL CABLE ADAPTOR
4 Claims, 3 Drawing Figs.

[52] U.S. Cl. .................................................. 339/230 R,
    339/277 R
[51] Int. Cl. .............................................. H01r 11/26
[50] Field of Search ................................... 339/153,
    154, 224–240, 277

[56] References Cited
UNITED STATES PATENTS
| 1,108,883 | 9/1914 | Bijur | 339/232 |
| 1,855,683 | 4/1932 | McCleary | 339/235 |
| 3,389,368 | 6/1968 | Schaefer | 339/232 |

FOREIGN PATENTS
| 374,574 | 4/1923 | Germany | 339/235 |
| 438,704 | 11/1935 | Great Britain | 339/230 |

*Primary Examiner*—Joseph H. McGlynn
*Attorney*—Paul & Paul

ABSTRACT: An adapter comprising an elongated body having means on one end for reception of the terminal post of a standard automobile battery and means on the other end adapted to receive the connector of a battery cable of the type used with batteries having threaded terminals.

INVENTOR.
DeLight E. Breidegam, Jr.
BY
Paul + Paul
ATTORNEYS.

BATTERY TERMINAL CABLE ADAPTOR

BACKGROUND OF THE INVENTION

This invention relates to automobile batteries and cables and their associated connectors, and in particular, to an adapter for use in connection with the replacement of automobile batteries having threaded terminals, with batteries having terminal posts.

To my knowledge in the prior art no means is provided for adapting existing cabling from one type of battery to the other as described above, without destruction of the cable itself.

SUMMARY OF THE INVENTION

My invention comprises an elongated body having a means at one end adapted to receive a terminal post of a standard battery as used in the automotive industry, and means at the other end adapted to receive the threaded connector on an existing battery cable of the type used for automobile batteries having threaded terminals. In the preferred embodiment of my invention the elongated body extends out beyond the periphery of the battery casing when one end is attached to the terminal post.

Accordingly, it is an object of my invention to provide a simple and easily installed, inexpensive adapter for use in the replacement of the battery having threaded terminals with a battery having terminal posts, without the need for destroying or replacing the existing cabling.

This and other objects of my invention will become apparent from the following description with reference to the accompanying drawings.

DESCRIPTION OF THE PREFERRED EMBODIMENTS

Figure 1:
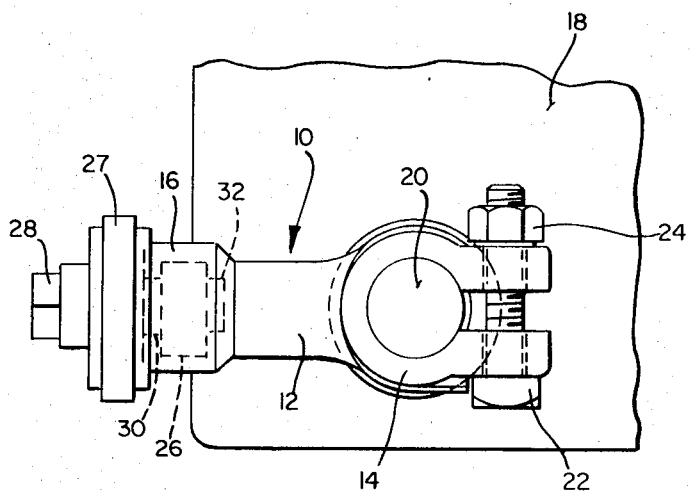
FIG. 1 is a plan view of a device in accordance with my invention shown mounted on a battery (only a portion of which is shown) and having a battery cable and connector attached to one end; the cable being foreshortened for the sake of convenience in illustration.

Although specific forms of the invention have been selected for illustration in the drawings, and the following description is drawn in specific terms for the purpose of describing these forms of the invention, this description is not intended to limit the scope of the invention which is defined in the appended claims.

The adapter designated generally 10 shown in the FIGS. comprises an elongated body having a neck portion 12 and terminating at one end in a means for receiving the terminal post of a standard automobile battery, said means comprising a female socket 14 of the same general configuration as similar sockets commonly found on battery cabling, and terminating at the other end in a female socket 16 for reception of the type of threaded terminal connector as would be found on battery cabling for connection to a battery of the type having threaded terminals.

The portion of the battery 18 shown for illustrative purposes is of a standard automobile type having a terminal post 20 protruding from the top. Dimensions for such posts are standard in the industry and it is within the contemplation of my invention that the socket 14 be adapted to fit these posts. The socket 14 is formed in an open C most preferably made of lead, which has provision in the open ends thereof for a bolt 22 and nut 24 whereby on tightening of the bolt into the nut the ends of the C are drawn together thereby clamping the socket 14 about the post 20.

The body and neck portion of the adapter are also made most preferably of lead, and terminate in the socket 16 which is also made of lead. Embedded into the lead socket 16 is steel nut 26 as can best be seen in FIGS. 2 and 3. This nut is designed to receive the bolt 28 of a battery cable connector 25 of the type used on batteries having female threaded terminals. It is within the contemplation of my invention that it can be made for use with different threaded terminals. For example, the threads on the various embodiments may be different in accordance with industry standards, as for instance, for a positive terminal as now used in the industry the nut 26 may be a ⅜–16NC and for the negative terminal the nut may be a 5/16–18NC.

Figure 2:
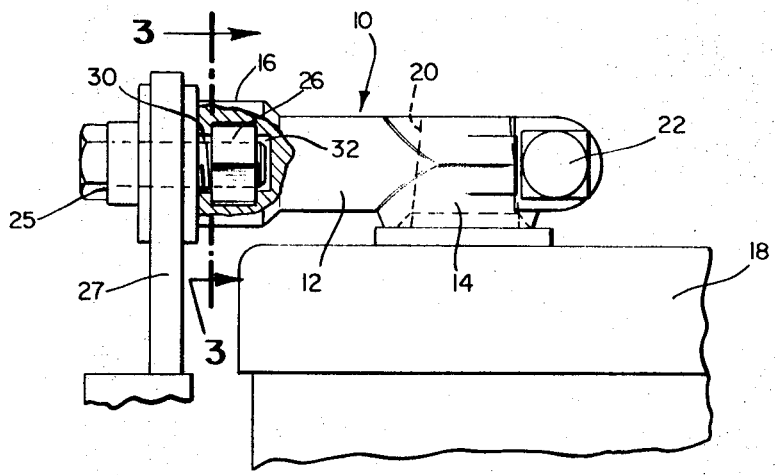
FIG. 2 is a side elevation of the apparatus shown in FIG. 1 with the device partially broken away.
Figure 3:
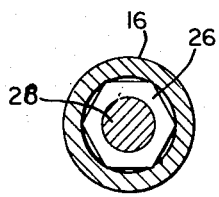
FIG. 3 is a section taken as indicated by the lines and arrows 3—3 in FIG. 2.

The body extends substantially perpendicular to the terminal post 20 out beyond the periphery of the battery housing as shown in FIGS. 1 and 2 to provide not only for clearance of the battery cable 27 and ease in assembly, but also to provide an extra length of terminal so that the existing cable can be attached thereto even through the amount of play in the cable may be minimal or the cable itself may be short. Further, this additional length obviates the need for bending the cable.

The nut 26 is completely surrounded by the lead socket 16 so as to be retained from moving axially with respect thereto or from rotating (see FIG. 2). However, sufficient clearance is provided in the hole 30 for passage of the bolt 28. The socket portion 16 further is of such an external diameter that it substantially duplicates the exterior surface of the sockets commonly found in existing batteries of the type having threaded terminals, so that it mates with the threaded terminal connector on existing cable. The nut 26 is axially positioned so as to allow the bolt 28 to fully engage the nut and the hole 30 is provided with sufficient clearance at the base thereof as at 32 in FIG. 1 so that the nut and bolt can be drawn up tightly without interference from the body portion of the adapter.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent Office, and is not intended to limit the scope of the invention described and claimed herein.

What is claimed is:

1. A battery terminal cable adapter comprising: an elongated body having means at one end thereof for reception of a terminal post; and means at the other end thereof for threaded connection to a battery cable connector, comprising a female socket having an internally threaded portion made of a material which is tougher than the external portion thereof.

2. A battery terminal cable adapter comprising: an elongated body having means at one end thereof for reception of a terminal post; and means at the other end thereof for threaded connection to a battery cable connector, comprising a female socket having an internally threaded portion, said internally threaded portion comprising a nut embedded in the external portion.

3. The invention of claim 2 wherein said nut is axially spaced inwardly from the end of said socket and a hole is disposed in said end communicating with said nut to allow a bolt to be threaded into said nut.

4. The invention of claim 3 wherein a clearance hole is provided axially beyond said nut and communicating with the threaded hole therein on the side of said nut remote from said first-mentioned hole.